March 25, 1958  E. J. DIEBOLD  2,828,462

INVERTER WITH ELECTROMAGNETICALLY OPERATED CONTACTS

Filed June 26, 1953  4 Sheets-Sheet 1

INVENTOR.
EDWARD JOHN DIEBOLD
BY Ostrolenk ... Faber
ATTORNEYS

March 25, 1958 — E. J. DIEBOLD — 2,828,462
INVERTER WITH ELECTROMAGNETICALLY OPERATED CONTACTS
Filed June 26, 1953 — 4 Sheets-Sheet 3

INVENTOR.
EDWARD JOHN DIEBOLD
BY
ATTORNEYS

United States Patent Office 2,828,462
Patented Mar. 25, 1958

2,828,462

INVERTER WITH ELECTROMAGNETICALLY OPERATED CONTACTS

Edward John Diebold, Ardmore, Pa., assignor to I-T-E Circuit Breaker Company, Philadelphia, Pa.

Application June 26, 1953, Serial No. 364,421

21 Claims. (Cl. 321—49)

My invention relates to inverters and is more particularly directed to electromagnetically operated contacts to obtain constant frequency and voltage control.

Inverters have many applications, a few of which are outlined below:

(1) *Straight inverter wherein the A.-C. power is derived from a D.-C. source.*—This type of inverter is used to provide a standby 60 cycle A.-C. supply from a storage battery. High voltage A.-C. from low voltage D.-C. as for example a radio transmitter supplied by a storage battery.

(2) *Inverter plus rectifier.*—In this case, a high voltage direct current is obtained from a low voltage direct current which is therefore equivalent to a D.-C. transformer, the rectifiers provided with phase control to permit variable high voltage D.-C. output from a constant low voltage D.-C. source. A single inverter, with a magnetic phase control rectifier, is the equivalent of an inverter with a magnetic amplifier to provide a variable D.-C. power output from a constant D.-C. power supply.

(3) *Rectifier plus inverter.*—This arrangement is used for transforming from a first A.-C. frequency to a second A.-C. frequency. A typical industrial example is the naval application to obtain 400 cycle A.-C. from a 60 cycle power supply. A rectifier with phase control plus an inverter provides transformation of A.-C. to A.-C. with adjustable frequency and voltage output. A stable frequency and stable voltage output is obtained from a variable frequency and variable voltage source. A typical example of the application of this type of arrangement is in aircraft, ship-board and railroad use.

(4) *Combination rectifier-inverter.*—In this arrangement a rectifier and an inverter unit using the same elements, for example, a battery charger and an A.-C. supply for the battery.

(5) *Rectifier inverter magnetic amplifier.*—This arrangement provides a small-size, fast-response 400 cycle magnetic amplifier from a 60 cycle supply.

Three different types of inverters are presently in major use:

(1) Most important is the vibrator type inverter, the principle consisting of a reed oscillating between two contacts and moved back and forth by a coil.

(2) Other inverters are electronic tube circuits which are usually referred to as oscillators.

(3) The third type is not actually an inverter but converts D.-C. to A.-C. This is the motor-generator, or the similar type dynamotor in which the A.-C. is generated anew in a machine driven by D.-C. motor.

Although the above are the three major types of inverters presently used, they all have limitations.

(1) The first one, vibrator inverters, closes contacts under voltage and thus requires that the contacts immediately carry a high current. The contacts carry the current as long as they are closed. When the reed swings in the opposite direction, it tears the contacts apart and an arc occurs. This arc is extinguished by the air between the two contacts.

For currents up to 10 amperes and low voltages, this principle is good. Higher currents and higher voltages can not be handled because the arc cannot be blown out. In the upper limits of usefulness, the contacts do not last because of the power arc damage.

The vibrator type inverter generates the frequency by a mechanical oscillation which can be held rather accurately by the choice of mass and flexibility of the reed as long as the contact does not wear out. If the contact wears out, the frequency changes, because the stroke changes.

An advantage of the vibrator type inverter is its low internal voltage drop. It can be used on low voltage A.-C. and is particularly useful for work off batteries to generate A.-C. which can then be transformed to high voltage.

(2) In the tube inverter, no contacts are involved. The tube, unless it degenerates for another reason, lasts for a very long time. A disadvantage is the internal voltage drop of the tube, making it useless on low voltage batteries. Another disadvantage is, that for large currents, very large tubes are needed. In the case of gas discharge tubes (which handle the large currents) the deionization time limits the application of the inverter. That is, when the voltage reverses very quickly after the current ceases to flow, the inverter will backfire.

The tube characteristics permits it to work as an inverter at a very high frequency. It also works at very high voltages. Practically, tube inverters are limited to high frequencies and high voltages due to these features.

The tube type inverter is of relatively low efficiency except under special circumstances. Its low efficiency creates heat problems and changes of ambient temperature are detrimental to gas discharge tubes, i. e., the tubes generate an appreciable amount of heat, variable with the load, yet should be kept at a constant temperature.

(3) The motor generator can handle almost any voltage and current with practically no limitation. Although the frequency is limited by the synchronous machine, it is very reliable and has a very long life. Disadvantages are high weight and bulk, vibration, need for maintenance for the bearings and brushes, and other trouble arising from the mechanical motion. Also, they have relatively low efficiency because the whole power has to be transformed twice from electrical power to mechanical power or back. Due to the extreme heat generated with these losses, the heat dissipation problems are sometimes difficult to solve.

The basic idea of my novel electromagnetic inverter is to insert a contact in parallel with a vibrator to solve its major problem, which is breaking an appreciable current with the vibrator contacts. When the vibrator contact opens, it is short-circuited by the parallel contact. When the current in the parallel contact decreases to zero, the contact must be opened. During the opening movement of the contact, the current through it and the recovering voltage across it are held at very low values.

In the mechanical rectifier art, a commutating reactor is placed in series with the contact. The commutating reactor, combined with adequate pre-excitation and an adequate spark extinguishing circuit, steps the current through the contacts to a desirable low value when the contacts are to be separated and maintains a low recovery voltage, as set forth in copending application Serial No. 212,017, filed February 21, 1951, now Patent No. 2,693,569.

In mechanical rectifiers, and in many other types of rectifiers, the instant at which the step occurs, is fairly easy to predict, and it is no great technical problem to open the contact during this time.

However, in an inverter, this is not possible because the inverter generates its own frequency. We do not know before hand when the step will occur, when the contact will open or if these two will occur simultaneously, whereas in a mechanical rectifier the A.-C. voltage follows a sine-wave given by an outside source which is constant and reliable.

Specifically, a mechanical rectifier, therefore, will not make an inverter because it is driven by a synchronous motor operating in synchronism with the frequency of the supplying A.-C. system. As an inverter, it is impossible to drive it in synchronism with the frequency which is yet to be generated. Therefore, although the mechanical rectifier opens its contacts during a step of low current provided by the commutating reactors, it can not be used in reverse as an inverter.

In this connection, I wish to mention the difference between a true inverter, also called a free inverter, which is a device generating its own A.-C. frequency and a so-called driven inverter which is furnishing power from a D.-C. source into an existing A.-C. network in which an A.-C. voltage is maintained by another device. The driven inverter can be a mechanical rectifier but an A.-C. source is required to maintain the voltage.

The failure of a device similar to a mechanical rectifier as a true free inverter is due to the lack of the so-called commutating voltage. The commutating voltage is the driving voltage which between two successively operating contacts, decreases the current in the contact to be opened and increases the current in the newly closed contact.

Absence of commutating voltage necessarily means that the current in the contact which is to be opened will not decrease. If the current does not decrease by itself, it will keep on flowing and unless the contact is opened by brute force and the current is interrupted by an arc, there is no means of creating an inverter.

My present invention is a free inverter requiring only a D.-C. source and no A.-C. source to maintain the commutating voltage, and utilizes principles of the mechanical and electromagnetic rectifier. An unfree or driven inverter running between a D.-C. source and a voltage maintaining A.-C. source, will immediately fail whenever the A.-C. source is taken away, whereas a free inverter or true inverter will work, regardless of the presence or absence of an A.-C. voltage source.

The following are the problems encountered by a free inverter:

*Problem 1.*—Must provide means or provide a system in which the current through the contact will reduce to zero, thus replacing the commutating voltage of the driven inverter or the rectifier. If we do not do this, we have a vibrator which every time the contact is opened, interrupts the full load current.

*Problem 2.*—A problem common with a mechanical rectifier or electromagnetic rectifier: Keep the current at a sufficiently low value for a sufficiently long time so that the contact can be opened without damage.

*Problem 3.*—Another problem which is common with the mechanical rectifier and the electromagnetic rectifier is the variation of the time at which the break must occur when the load varies. This problem for the inverter is much more difficult than for the rectifier, because of the unknown phase angle between load voltage and load current in the inverter.

*Problem 4.*—Must provide means of timing the closing of the inverter contacts in order to obtain an A.-C. of desired frequency. This problem is particular to free inverters and involves a system generating its own frequency or containing a frequency standard.

The manner in which the four above mentioned problems are solved in my novel inverter:

*Problem 1.*—A direct voltage is applied through an inverting device to a load which should be subjected to A.-C. It is possible to do this by means of an electric contact. As soon as the electric contact is closed, the A.-C. load receives current from the D.-C. source, and unless provision is made to decrease it at a later instant, this current keeps on flowing until the A.-C. source is exhausted.

The current flowing through this contact can be decreased to zero by closing another contact in parallel to the first one and to provide an additional voltage in the circuit between these two contacts in such a way that the voltage drives the current out of the D.-C. source and flowing into the A.-C. load away from the first mentioned contact into the second contact which now is freshly closed.

A simple way of doing this, is to make this A.-C. load highly capacitive by connecting a large capacitor in parallel to it. When the first contact has been closed for an appreciable time, the capacitor will assume a voltage which is approximately equal to the voltage supplied by the D.-C. source. The second contact is closed on the circuit in such a way that the capacitor through the second contact is connected in opposition to the D.-C. source (with respect to the way it was connected before by the first contact). It will now have a charge in opposite direction to the D.-C. source and suddenly absorb a very large current through the second contact.

If the D.-C. source can supply this new large current without losing its voltage, this procedure does not bring the desired result. We have now two contacts closed in opposition to each other, that is, to the two opposed ends of the A.-C. load from the same D.-C. source. An ever-increasing direct current will flow through both contacts being equivalent to a short circuit of the D.-C. source. This is referred to as a "spill-over of the inverter."

If the D.-C. source is prevented from supplying this large and rapidly increasing current of the second contact, then the current in the second contact will increase to the detriment of the current in the first contact. The second contact will take the current away from the first contact, until it has assumed all the current of the first contact.

An easy means to maintain, for the short time required, two constant direct current supplied by the D.-C. source, is a large choke or inductor. If, under these circumstances, after the first contact was closed for a certain time and the capacitive load charged in the same polarity as the D.-C. source, and now the second contact is closed, with a reversal of the A.-C. load with respect to the D.-C. source, a large current will flow in the short-circuit established between the A.-C. load which is capacitive, and the two contacts. This short-circuit current is in the direction of increasing the current in the second contact and decreasing the current in the first contact. By this means, it is possible to reduce the current in the first contact within a very short time to zero, such as to have a true commutation similar to the commutation of a rectifier.

Compared to a rectifier, where the commutation is made by short circuiting two contacts until the A.-C. voltage, which is supplying the rectifier, drives the current from one contact into the other contact, in the inverter the commutation is done by a capacitive load, which is charged in one half-cycle, and which charge then provides the commutation.

Referring to this capacitive load, this means that a capacitor of sufficiently large size is always connected in parallel to the load, such as to ensure the desired aggregate capacitance.

Thus, to solve the first problem, commutation of the inverter is achieved by a partial discharge of the charged capacitive load, through two contacts forming a short circuit loop, while, during this time, the D.-C. source is prevented from delivering a short circuit current by a choke which maintains the direct current at approximately stationary value.

In other words, the combined action of the charged capacitor, the surge current limiting choke, and a short circuit loop formed by the two contacts reduces the current in the contact which should be opened, by bucking it with a short circuit current, and increases the current of the newly closed contact by boosting it with the short-circuit current.

In order to obtain the desired effect, the inductance of the choke in the D.-C. source is made many times larger (e. g. ten times) than the aggregate inductance of the commutating circuit formed by the A.-C. load capacitor, the leakage reactance of the transformer and the short circuit loop through the two closed contacts.

*Problem 2.*—When the current has reached zero, it should be held at a low value, and when the contact opens, the voltage across the contact should be low. The method for doing this, is identical with the one used in mechanical rectifiers. It consists of a commutating reactor with a bias or pre-excitation, a spark extinguisher circuit across the contact, and a straightener circuit on one of the commutating reactor windings.

Whereas in a rectifier, an A.-C. pre-excitation is supplied by the A.-C. source, feeding into the rectifier, in an inverter, an A.-C. pre-excitation is not possible. A D.-C. pre-excitation fed by the D.-C. source, combined with adequate straighteners and eventually an A.-C. pre-excitation supplied by the load voltage, can be made in such a way that it is adequate (but not perfect during the starting period).

When the current through a contact and in series with its commutating reactor is large, the commutating reactor will be fully saturated by this current. The current decreases to zero, as mentioned previously due to the combined action of the load capacitor and the D.-C. choke, and when it reaches zero, the commutating reactor will go through its step. Pre-excitation, straighteners, and spark extinguishing circuits, compensate for the magnetizing current of the commutating reactor, in such a way as to afford the best possible protection of the contact.

During the step, the voltage appearing on the commutating reactor is furnished by the commutating capacitor situated in the load circuit, it being understood that the commutating capacitor is large enough to supply the voltage for the duration of the step.

*Problem 3.*—This problem consists of opening the contact almost instantly when the current is decreased to zero, and the commutating reactor is going through its step. This problem can be solved with an electromagnetic contact as described in my copending applications, Ser. No. 257,398, filed November 20, 1951, now Patent No. 2,756,380; and Ser. No. 257,901, filed November 23, 1951, now Patent No. 2,797,380; and in Patents 2,619,628 and 2,617,974.

This electromagnetic contact consists of a small electric contact which is an integral part of a ferro-magnetic armature. This armature moves towards and holds on to another contact by an electromagnetic field generated by the current flowing through the contact.

In other words, when a current flows through this contact, the current itself provides the force holding the contact closed. As soon as this current ceases to flow, the contact opens, under the action of a spring, or another magnetic or electromagnetic field, which will hold the contact in the open position. This device, in conjunction with the circuit as described, will automatically provide for a contact opening, when the current ceases to flow, and thus the correct operation of the inverter is assured.

It should be mentioned that different embodiments of this same idea are possible. For example, a contact held by a blade spring pulled toward iron poles coated with silver, or a contact moving freely in the space between two iron pole systems, where one system holds the contact open and is energized by a permanent magnet or a D.-C. current coil, and the other magnet holding the contact closed is energized by the current flowing through the contact itself as shown in copending application Serial No. 249,731, filed October 4, 1951, now Patent No. 2,774,920. The contact may have the construction shown in copending application Serial No. 491,350, filed March 1, 1955.

The above mentioned solution of the problem (i. e. a contact that is held closed by the current itself and opens when the current reaches zero) solves another problem which exists for A.-C. voltage-driven devices, like mechanical rectifiers and A.-C. coil vibrators. In these devices, the time of contact opening is determined by the A.-C. voltage wave. This is permissible in rectifiers, because there the load is always a D.-C. circuit, hence the phase displacement between voltage and current in the load does not exist. Thus the phase angle between voltage and current in a rectifier is always given by the rectifier itself and, except for a small correction due to the overlap, equal to the phase delay purposely introduced for voltage control.

In an inverter, current and voltage on the load side are A.-C. waves and not necessarily in phase. The phase angle between them is determined by the kind of load (resistive, inductive, capacitive) and can vary from 90° leading to 90° lagging, in a way which is uncontrollable from the inverting device. Voltage-controlled devices like mechanical rectifiers, synchronous vibrators (driven by A.-C.) et al., therefore, are not adequate as inverters, because the zero-current time cannot be anticipated from the voltage wave.

In addition to this problem which is not present if the electromagnetic current-driven switch is used, it also accounts for the variations in overlap time, which are due to variations of load current, kind of load and frequency. A current-driven device automatically opens when the contact current is zero, no matter how long the overlap is.

*Problem 4.*—The switch in conjunction with the commutating reactor operates the same way as it does in a rectifier with one exception, and that is the closing of the contact. When the first contact is closed, a second contact will be closed also, initiating a short circuit which, in turn, causes commutation to create a step and the subsequent opening of the first contact.

One problem is how to close this second contact. This problem is entirely separate from the ones described before, is particular to the inverter and must be solved by entirely new means.

In any rectifier, the closing of a contact (or very generally a circuit) can be done by grid control, by an auxiliary current flowing in a coil, by mechanical means driven by a synchronous motor or similar means. All these means have one thing in common, that is, they are driven by an A.-C. voltage, or the closing occurs in synchronism with an A.-C. voltage. By delaying the phase angle of this closing, with respect to the driven synchronous voltage, the output voltage of the rectifier can be regulated.

In an inverter, the basis for closing the contact, that is the A.-C. voltage, is lacking. Not only is there no A.-C. voltage to supply the synchronous timing, there is no means of delaying the firing point to supply regulation. If in an inverter, the firing point is delayed, everything happens just the same, but later, and the frequency decreases. If in an inverter the firing point is put ahead, or made earlier, everything happens earlier and the frequency increases.

Therefore, in an inverter, the first and paramount problem becomes to obtain a constant frequency of a desired amount. Voltage control is another problem and cannot be solved by phase delay in a free or true inverter. Note, if the inverter is not a free inverter but an inverter operating on an A.-C. system (that is, a dependent inverter), then output voltage control is possible by means of phase advance, similar to the control of phase delay of a rectifier. The frequency then is given by the outside A.-C. voltage source which also supplies the commutating voltage. The problem of contact closing in a free inverter, therefore, is a problem of maintaining a constant frequency.

Another aspect is that this closure of the contact can occur almost at any time as long as no specific requirement for synchronization is made. It is, therefore, important to distinguish between free inverters and driven inverters because inverters operating in parallel must be synchronized like any other type of A.-C. voltage generator. In the case of parallel operation, one inverter will have to be a free inverter, maintaining the frequency, and all the other inverters will be driven inverters connected to the first one in such a way that they are all in phase.

In a free inverter, using an electromagnetic switch as a means to carry the current, the switch is closed by an auxiliary current flowing through the closing coil or through an auxiliary coil of the magnet operating the switch. This auxiliary current must flow for a short time only, during each half cycle, long enough to close the switch and to permit the full rise of current through it.

The sources of auxiliary current to close a contact are, for example, vibrators operating from the same D.-C. supply as the inverter, or electrical oscillating circuits operating from the same D.-C supply, these circuits to be stabilized either by an oscillating circuit consisting of inductance and capacity or by crystal oscillators or electromechanical tuning-fork oscillators.

In the case of a vibrator, the contacts of a vibrator are connected in parallel to the electromagnetic contact. When the vibrator closes, a current flows through the vibrator contact until the electromagnetic contact is closed. The electromagnetic contact now short-circuits the vibrator which can open without current. When the vibrator closes in the opposite direction, the opposite electromagnetic contact closes, short-circuiting again the vibrator which oscillates back into the first position.

By this means, it is possible to have a vibrator drive the inverter, without carrying any appreciable load and without the slightest amount of arcing on the vibrator contact, because the vibrator contacts always open when the electromagnetic contact short-circuits them, and, hence, the opening voltage across the vibrator contact is zero. For the vibrator, this is a very light duty and the vibrator contact will last practically forever.

Whenever the inverter is subjected to variable load, it will affect only the opening of the electromagnetic contacts, without in the slightest way interfering with the operation of the vibrator. Thus, the frequency given by the vibrator is constant and independent of the load.

The inverter, as described, operates almost the same way as a classical vibrator type inverter, except that the vibrator previously used to carry the load current now only carries an auxiliary current, initiating the flow of power through the main contacts, these main contacts being operated in such a way as not to be affected by the power, and the vibrator being connected in such a way that it never handles any sizable amount of power.

Accordingly, an object of my invention is to provide a free inverter having substantially no spark or arc at the cooperating contacts.

Another object of my invention is to provide an inverter with a commutating capacitor in parallel with the load which discharges a bucking current through one current carrying contact to permit currentless interruption.

Another object of my invention is the provision of a smoothing choke in the D.-C. supply circuit, which limits the total current of the inverter, during the short circuit interval existing during the common rotation period.

A still further object of my invention is to provide a free inverter with a smoothing choke and capacitor to reduce the opening current of the contact to zero.

Another object of my invention is to provide an inverter in which the current provides the force for maintaining the contacts closed.

Another object of my invention is the provision of a novel circuit for an inverter to maintain recovery voltage at a low magnitude following contact separation.

Another object of my invention is the provision of a commutating reactor for an inverter to achieve substantially currentless interruption.

A further object of my invention is the provision of circuitry for a free inverter to maintain a desired frequency for the load.

A still further object of my invention is to provide main contacts for a free inverter which operate independently of the amount of power delivered.

Another object of my invention is to provide a free inverter in which the frequency is constant and independent of the load.

A further object of my invention is to provide a vibrator type inverter in which the vibrator carries only auxiliary current.

These and other objects of my invention will be apparent from the following description when taken in connection with the drawings in which:

Figures 2a, 2b, 2c and 3a, 3b, 3c and 3d illustrate the conditions and operation of the inverter circuit of Figure 1 by a plot of voltage and current against a common time base. Figures 2a, 2b, 2c illustrate the voltage and current conditions when the commutating circuit is completely devoid of inductance and hence with commutating time being zero and Figures 3a, 3b, 3c, 3d illustrate the voltage and current conditions with an inductive commutating circuit and a finite commutating time.

Figure 1:
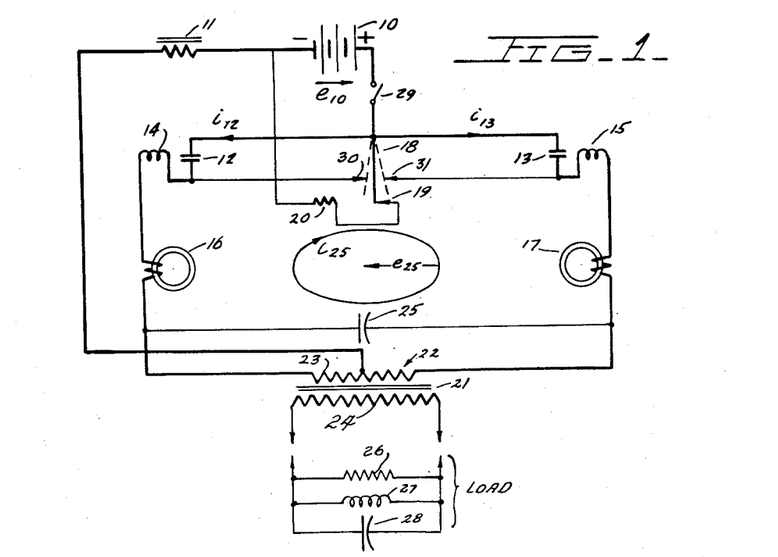
Figure 1 is a circuit diagram of my novel free inverter.

Referring now to Figure 1, I have shown my novel free inverter connected to the D.-C. source or battery 10 to supply A.-C. to a load comprising the resistance 26, inductance 27 and capacitor 28. One terminal of the battery is connected through the starting switch 29 to the fixed end of flexible oscillating reed 18. The vibrator is tuned to the desired frequency by selecting a reed 18 of proper mass and spring constant. The vibrator is provided with fixed working contacts 30, 31 and an auxiliary contact 19. The operating coil 20, having a first end connected to the second terminal of the D.-C. source 10 and a second end connected to the auxiliary contact 19, operates the magnetic reed 18 when it is in engagement with the auxiliary contact 19 to thereby move into engagement with working contact 30.

Electromagnetically operated contacts 12 and 13 are connected at one end to the fixed end of reed 18 and to the working contacts 30 and 31, respectively. Operating coils 14 and 15, respectively, are connected in series with the parallel path of the working and electromagnetically operated contacts 30, 12 and 31, 13. Commutating reactors 16 and 17, respectively, are connected in series with the contact operating coils 14 and 15 and to the ends of the primary winding 22 of transformer 21. The secondary winding 24 of the transformer 21 is connected to the load 26, 27, 28. The secondary winding 24 will preferably have a much larger number of turns than the primary winding 22. A choke 11 in the D.-C. circuit is connected to a second terminal of the D.-C. source 10 and to the center tap of primary winding 22. A capacitor 25 is connected in parallel with the primary winding 22 of the transformer 21.

The reed 18 in its rest position slightly touches the fixed contact 19. When the starting switch 29 is closed, a current starts flowing from the positive terminal of D.-C. source 10 through starting switch 29, through reed 18, auxiliary contact 19, reed operating coil 20 back to the negative terminal of the D.-C. source 10 (10—29—18—19—20—10).

The reed operating coil 20 attracts the magnetic reed 18 which moves over and touches the fixed working contact 30. When the reed 18 touches the working contact 30, the direct voltage of the source 10 is now applied to the short-circuit formed by 10, 29, 18, 30, 14, 16, 23, 11. The largest impedance in this circuit is the commutating reactor 16, hence, the voltage $e_{10}$ of the source 10 now appears on the reactor 16. A small magnetizing current of the reactor 16 now flows through this short-circuit. The time during which this small current flows, is called the make step, and its duration, the make step length. Working contact 30 closed by the magnetic reed 18, therefore, immediately after closing must only carry the make step current i. e., not a large inrush current which could be detrimental to this circuit.

After a short time, when the make step has elapsed and the core of reactor 16 is saturated, a current rises through the above mentioned short-circuit and contact operating coil 14 is energized. The contact operating coils 14 and 15 are designed in such a way that a small current sufficiently magnetizes them to respectively close main contacts 12 or 13. The coil 14, through a closing magnet structure (not shown), closes the main contact 12 while the reed 18 and the working contact 30 are still closed. Therefore, the contact 12 closes without voltage across it, which should prevent premature flash-over.

The current which was flowing through the reed 18 and the working contact 30 is now by-passed by main contact 12 which has less resistance because it is larger. Also, the main contacts 12 and 13 are made from a relatively soft low-resistance material like silver or an alloy containing a great amount of silver. The working contacts 30 and 31, which have to operate at a very small load only, can be made from very hard materials like tungsten, molybdenum or similar, in order to prevent excessive transfer of matter.

From the time that main contact 12 starts to carry the main current, the reed 18 and the working contact 30 will cease to carry a current. The reed 18 will swing back without arcing and finally hit auxiliary contact 19 and subsequently working contact 31. That is, the main contact 12 will short-circuit the working contact 30 and the reed 18 and hence, the breaking of the contact 18—30 will occur without sparking.

It must be noted that the vibrator is constructed so that electrical contact engagement between the magnetic reed 18 and the auxiliary contact 19 occurs only when the reed 18 is stationary or when moving through center position toward working contact 30. However, when the magnetic reed moves through center position toward working contact 31, it does not come into electrical engagement with auxiliary contact 19 although it may engage same during its movement.

Now a large current flows through the circuit comprised by 10, 29, 12, 14, 16, 23, 11. This current increases in magnitude due to the effect of the choke or coil 11. In the secondary 24 of the transformer 21, a current is induced by the current flowing in the left half of primary winding 22. The voltage of the source 10 now gradually appears on the capacitor 25 and the transformer 21 which transforms it into the load circuit to appear on 26, 27, 28. Voltage appearing on capacitor 25 means that it is charging up in the direction of the D.-C. voltage impressed upon the circuit by the D.-C. source 10.

The rate of rise of the current and voltage in these circuits is determined by the inductance of coil or choke 11, the voltage of source 10, the capacity of capacitor 25 and the impedance of the load 26, 27, 28. After a certain time which is determined by the mass and the elasticity of the reed 18, it will over-swing into the opposite position and close the contact 31.

A current now starts flowing through the circuit 10, 29, 18, 31, 15, 17, 22, 11, 10. The rise of this current is first prevented by the make step of the commutating reactor 17, thus, preventing an excessive inrush current through the contact 31. After a short time, the core of reactor 17 will be saturated, an appreciable current now flows through the circuit, causing the coil 15 to magnetize the closing magnet of the electromagnetic main contacts 13. Now both the main contacts 12 and 13 are closed.

The capacitor 25 has been charged in such a direction (positive at the left, negative at the right) as to oppose the current flowing through main contact 12 and to boost the current flowing through main contact 13 because the contact 12 has been closed a long time previously and the capacitor 25 has been charged up through it, whereas the contact 13 now has the tendency to charge it in the opposite direction.

The capacitor 25, therefore, generates a short-circuit current through 16, 14, 12, 13, 15, 17. This short-circuit current encounters practically zero inductance, and practically zero resistance, while being supplied by the large capacity of capacitor 25. The short-circuit current, therefore, rises extremely rapidly.

During the short time of rise of the short-circuit current, the current supplied by the D.-C. source 10 into the two parallel circuits closed by main contacts 12 and 13 cannot rise by an appreciable amount, because the choke 11 in turn prevents a fast rate of rise of the current through it.

After a very short time, the short-circuit current through the above mentioned circuit has completely overcome the load current previously flowing through contact 12. The full load current now flows through main contact 13. At this instant, the core of reactor 16 unsaturates, the voltage of the capacitor 25 now appears on 16 and a further increase of the short-circuiting current is stopped by the high reactance of 16.

Thus, the current through the branch comprising the left half of primary winding 22, commutating reactor 16, contact operating coil 14 and main contact 12 (22—16—14—12) will go to zero. As the current through branch 22—16—14—12 reaches zero, the contact operating coil 14 will be demagnetized and hence, the main operating contact 12 will open. That is, the main contact 12 opens during the step provided by the commutating reactor 16. Hence, the main contact 12 opens without current and therefore without arcing.

At this time, the main current will flow from the

D.-C. source 10 through the starting switch 29, the main contact 13, the contact operating coil 15, commutating reactor 17, the right half of primary winding 22, through the choke 11 and back to the D.-C. source 10 (10—29—13—15—17—22—11—10). During the period of time that the current is flowing through the above mentioned circuit, the capacitor 25 will be charged in the reverse direction. That is, the right side will be positive and the left side negative.

As the magnetic reed 18 leaves the stationary working contact 31, it moves toward the stationary working contact 30, the entire cycle heretofore described will be repeated and continuous alternating current will be supplied to the load 26, 27, 28.

The electrical conditions and operation of the inverter shown in Figure 1 is illustrated in the voltage and current curves of Figures 2 and 3. In the current voltage curves of Figure 2, it has been assumed that the commutating circuit comprised of primary 22, commutating reactor 16, contact holding coil 14, main contact 12, main contact 13, contact holding coil 15, commutating reactor 17 (22—16—14—12—13—15—17—22) is completely devoid of inductance and therefore the commutating time is zero.

In the time interval $t=t_0$ to $t=t_1$, as seen in Figure 2, the working contact 30 and the main contact 12 is closed. The working contact 30 closes at $t=t_0$. The main contact 12 closes shortly after the working contact 30 and opens at the time $t=t_1$.

The voltage $e_{25}$ on the capacitor 25 is opposite to the $+e_{10}$ voltage of the D.-C. source 10 when the working contact 30 closes at time $t_0$. The large difference in voltage between $e_{25}$ and $+e_{10}$ at time $t=t_0$ appears on the choke 11, as shown by the shaded area $e_{11}$ in Figure 2a. This voltage produces an increase in the current $i_{10}$ which is delivered by the D.-C. source 10 when the capacitor 25 is discharged and subsequently recharged in the opposite direction; the charge $e_{11}$ reverses in direction, as shown in the figures, and the current $i_{10}$ again decreases. It is apparent that the shaded area $e_{11}$ indicated in Figure 2a, which is negative below the line of $+e_{10}$ and positive above the line $+e_{10}$, amounts to zero over one half cycle.

The voltage $e_{25}$ is the A.-C. voltage produced by the inverter, and its average value per half cycle is equal to the D.-C. voltage of the source 10. As clearly seen in Figure 2a, the A.-C. voltage is not a sine wave.

Figure 2A:
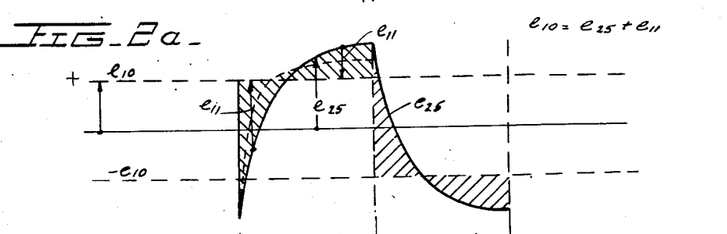
Figure 2a is a voltage-time diagram showing D.-C. source voltage $e_{10}$ and the A.-C. commutating capacitor voltage $e_{25}$.
Figure 2B:
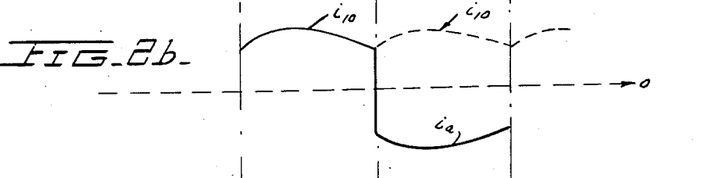
Figure 2b is a current-time diagram showing the source current $i_{10}$ and A.-C. current $i_a$.

The direct current $i_{10}$ from the source 10 is illustrated in Figure 2b. As heretofore noted, this current increases during part of the half cycle and thereafter decreases, the amount of increase and decrease being limited by the choke 11 and the difference of the voltages between the source 10 and the capacitor 25. In order to keep the current variations at a minimum, the choke 11 is made with a large inductance. The A.-C. current delivered by the inverter, including the capacitor 25, is shown as $i_a$.

Figure 2C:
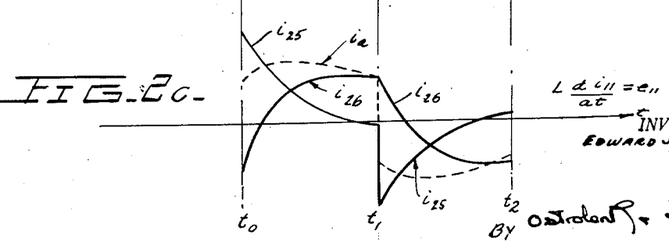
Figure 2c is a current-time diagram showing the A.-C. load current $i_{26}$, commutating capacitor current $i_{25}$ and A.-C. current $i_a$.

Referring now to Figure 2c, the portion of the inverter current $i_a$ which flows through the capacitor 25 is indicated as $i_{25}$ and the portion which flows through the load 26 is indicated as $i_{26}$. The capacitor current $i_{25}$ is a powerless capacitor current, permitting the commutation of current $i_a$ at the time $t=t_0$ and $t=t_1$. The sudden change in the current ($i_a$) is due to the sudden change of the current $i_{25}$ and not due to the load current $i_{26}$.

Figures 3a, 3b, 3c and 3d are voltage-current representations of the conditions in the inverter with an inductive commutating circuit and a finite commutating time. A comparison of Figures 3a, 3b, 3c, 3d with Figures 2a, 2b, 2c illustrates that the difference is extremely small.

Figure 3A:
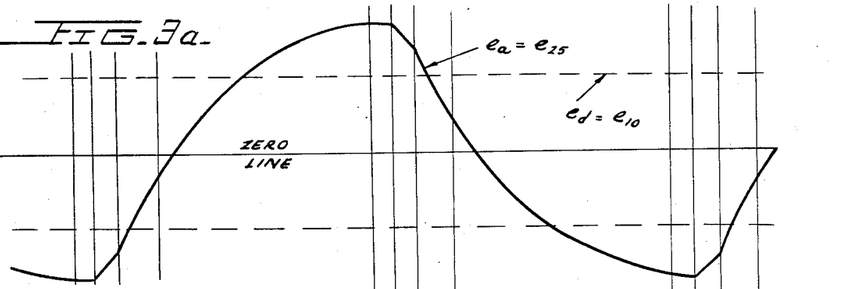
Figure 3a is a voltage-time diagram showing D.-C. source voltage $e_{10}$ and the A.-C. voltage $e_{25}$.
Figure 3B:
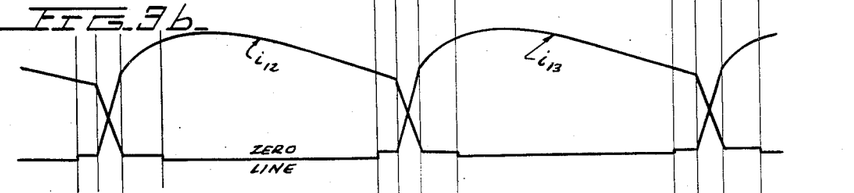
Figure 3b is a current-time diagram showing the phase currents $i_{12}$ and $i_{13}$ flowing through contacts 12 and 13 respectively.

Figure 3a shows the alternating voltage $e_a$ of the inverter. The direct voltage $e_{10}$ of the source 10 is shown in dotted lines, positive and negative as it appears alternately considered from the A.-C. output side of the inverter. The phase currents $i_{12}$ and $i_{13}$ of Figure 3b are the currents flowing through the main contacts 12 and 13. It is assumed that the currents through the vibrator working contacts 30 and 31 are extremely small and of short duration and hence are not shown on the diagram. The working contact 30 closes at the time $t_1$ and the main contact 12 opens at the time $t_7$ or a short time thereafter.

The current $i_{12}$ is kept at a low value by the commutating reactor 16 during the time from $t_1$ to $t_2$ which is called the make step. Between the interval from $t_2$ to $t_3$, the current $i_{13}$ decreases from a large value to almost zero value and the current $i_{12}$ rises from almost zero value to its full value. This interval of time from $t_2$ to $t_3$ is called commutation.

In the time interval from $t_3$ to $t_4$, the current $i_{13}$ is kept at a very low value by the commutating reactor 17. This period of time from $t_3$ to $t_4$ is referred to as the break step.

Figure 3C:
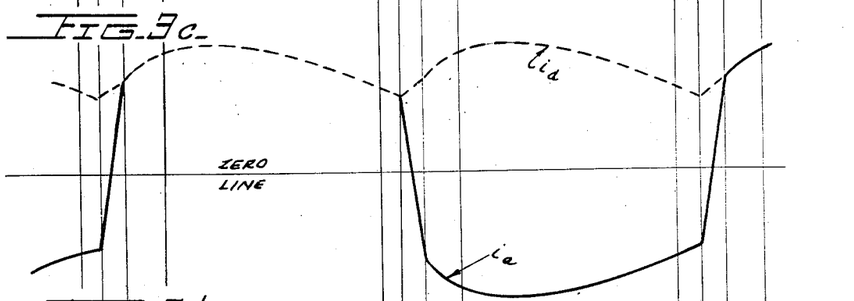
Figure 3c is a current-time diagram showing the A.-C. current $i_a$ produced by the inverter.

The main contact 13 opens sometime during the break step between times $t_3$ and $t_4$. A comparison of the A.-C. current $i_a$ produced by the inverter to the D.-C. current $i_d$ drawn from the source 10 is seen in Figure 3c. The commutation intervals $t_2$-$t_3$ and $t_6$-$t_7$ permit the reversal of current $i_a$ while the current $i_d$ increases only slightly because the source 10 is short-circuited by the main contacts 12 and 13. However, the current is kept from increasing rapidly due to the inductance of the choke 11.

Figure 3D:
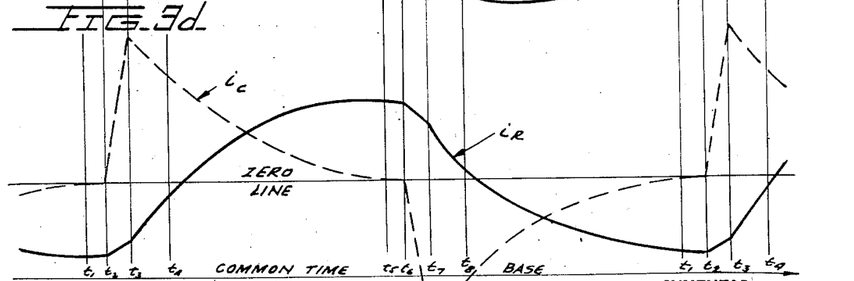
Figure 3d is a current-time diagram showing the current $i_R$ ($i_{26}$) flowing through the resistive load of the inverter and current $i_c$ ($i_{25}$) flowing through the commutating capacitor.

The current $i_r$ or $i_{26}$ flowing through the resistive load 26 and the current $i_{25}$ flowing through the capacitor 25 are shown in Figure 3d. It appears that the shape of the current $i_a$, which accounts for the necessary lead of the A.-C. voltage $i_a$ over the A.-C. voltage $e_a$ is determined by the capacitive current $i_c$ ($i_{25}$) which adds to the load current $i_r$ ($i_{26}$).

Figure 4:
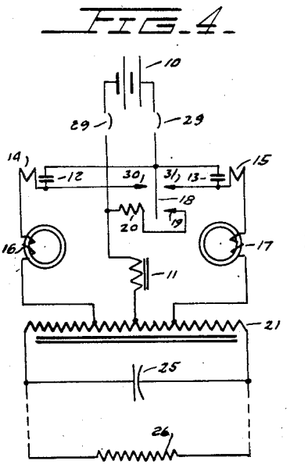
Figure 4 is a modification of the inverter of Figure 1 wherein the inverter is adapted with an auto-transformer and the capacitor connected to the high voltage secondary.

Figure 4 shows a first modification of the inverter of my invention. In this modification, the transformer 21 is shown as an auto-transformer with a high voltage A.-C. output operated from a D.-C. source and the capacitor 25 is connected to the high voltage secondary of the transformer 21 instead of the primary winding as shown in Figure 1. The arrangement shown in Figure 4 is desirable, since auto-transformers are smaller than the standard type transformer for the same rating. Also, high-voltage, low-capacity, capacitors are much smaller than low-voltage, high-capacity, capacitors of the same kvar rating.

It should be noted that for a satisfactory inverter operation, the capacitor 25 needs a high capacity $c_h$ at the low voltage $e_1$, or a low capacitay $c_1$ at the high voltage $e_h$ with $e_h^2 c_1 = e_1^2 c_h$. For example, if the primary voltage at the transformer 21 is 100 volts and the secondary voltage is 1000 volts, and the capacity required on the primary side is 1000 microfarads, then only 10 microfarads are needed on the secondary to reach the same result. This method works only with transformers of low leakage reactance, and auto-transformers (as used in the modification of Figure 4) usually have a much smaller leakage reactance than normal transformers. In the embodiment of Figure 4, I have shown a D.-C. two pole circuit breaker replacing the switch 29 of Figure 1.

Figures 5, 5A:
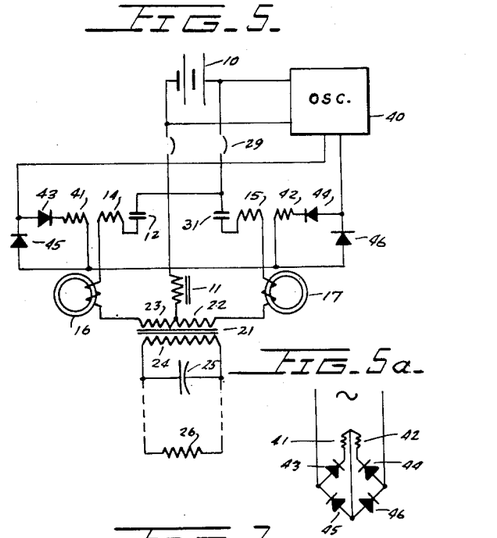
Figure 5 is a second modification of the inverter of Figure 1 wherein the reed vibrator is replaced by an oscillator device.
Figure 5a is a circuit diagram of the oscillator drive used in Figure 5.

Figure 5 shows a modification of the inverter of Figure 1 wherein the vibrator consisting of the magnetic reed 18, the auxiliary contact 19, the operating coil 20 and the working contact 30, 31 are replaced by an oscillator drive consisting of the oscillator 40, 41, 42 and rectifiers 43, 44, 45, 46. The circuit diagram for the bridge connection of the oscillator drive is shown in Figure 5a. In the arrangement of Figure 5, the oscillator 40 is supplied with power from the D.-C. source 10. It will be noted that the oscillator 40 may consist of a tube oscillator, a multivibrator, gas discharge tubes, a crystal driven oscillator or an electromechanical oscillator. The power output of the oscillator 40 is a small portion of the power output of the inverter. The output power of the oscillator 40 is rectified by the short-circuited, bridge connected, rectifiers 43, 44, 45, 46 as best seen in Figure 5a.

The coils 41 and 42 operate alternately on rectified half wave pulses supplied by the oscillator 40. These coils 41 and 42 are mounted on the same magnetic structure as the contact operating coils 14 and 15, respectively, these magnets being the drive magnets for closing the main contacts 12 and 13. Since the structural arrangement of the magnetic switches forms no part of my present invention, it has been deleted from the circuit diagrams for the sake of simplicity.

Figure 7:
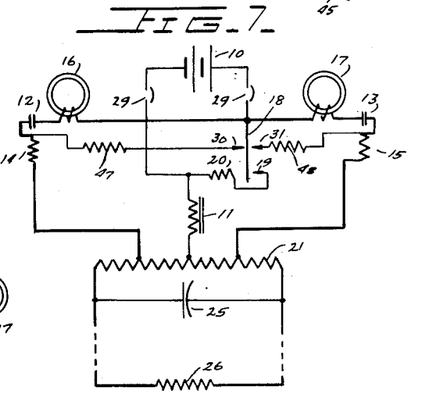
Figure 7 is a fourth modification of the inverter of Figure 1 wherein the commutating reactors are in series with the main contacts only.
Figure 8:
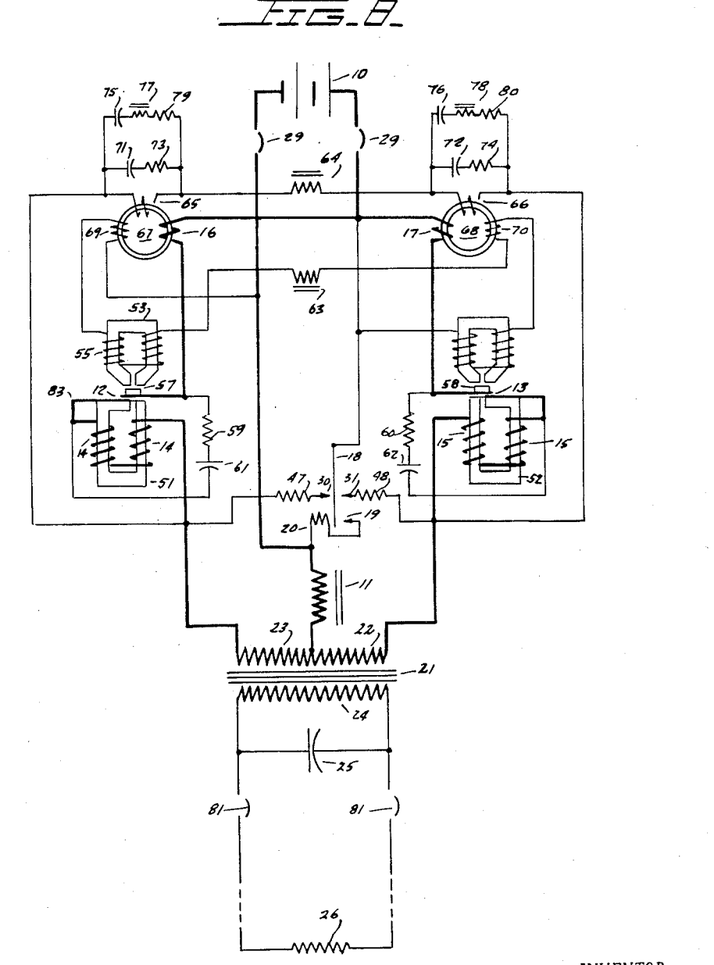
Figure 8 is a circuit diagram of the inverter of Figure 7 showing the auxiliary component and circuits added.

Figure 8, hereinafter more fully described, illustrates the type of magnetic switch structure which may be used in the circuit embodiments of Figures 1, 4, 5, 6 and 7.

Referring again to Figure 5, whenever the main contacts 12 and 13 are closed by the contact operating coils 14 and 15, the inverter will operate in the same manner as heretofore described in connection with Figure 1.

The advantage of the circuit arrangement shown in Figure 5 is the use of an oscillator with accurate frequency or a frequency which is adjustable to any desirable value by the oscillator. That is, in Figure 1, the magnitude of the frequency is determined by the mass of spring constant of the magnetic reed 18. However, in the circuitry of Figure 5, the vibrator and magnetic reed 18 can be eliminated and replaced by the oscillator 40 which will function to determine the output frequency to the load 26.

Figure 6:
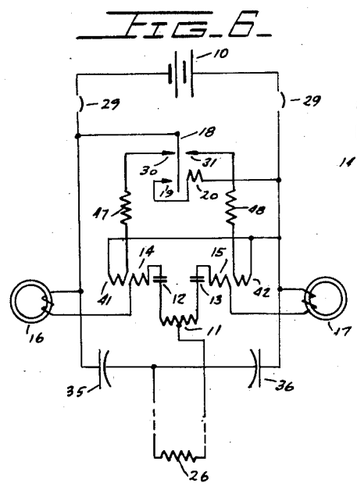
Figure 6 is a third modification of the inverter of Figure 1 wherein the transformer is eliminated and two capacitors are connected in series with the load.

Referring now to Figure 6, I have shown a third modification of my inverter which utilizes the magnetic reed arrangement of Figure 1 but also incorporates the contact operating coils 41 and 42 of Figure 5. In this arrangement, the oscillator is a vibrator type battery driven inverter consisting of the magnetic reed 18 which is pulled back by the coil 20 when the auxiliary contact 19 is engaged by the reed 18. The reed 18 oscillates with its mechanical resonant frequency and alternately engages the working contacts 30 and 31, as described in connection with Figure 1. When the reed 18 touches or engages the working contact 30, a current will flow from the D.-C. source 10 through one pole of the D.-C. breaker 29, the magnetic reed 18, working contact 30, resistor 47, contact operating coil 41 and back through the second pole of the two pole D.-C. breaker 29 to the other terminal of the D.-C. source 10

(10—29—18—30—47—41—29—10)

The resistor 47 is of sufficient magnitude to limit the current flowing in this circuit to a small value. The current now flowing through the contact operating coil 41 magnetizes the drive magnet of the main contact 12 and hence, this contact closes immediately. The commutating reactor 16 limits the inrush current through the main contact 12 to a low value, during a short time interval referred to as the make step. When the core of the commutating reactor 16 becomes saturated, a current will rise through the circuit from the positive terminal of D.-C. source 10, one pole of the D.-C. breaker 29, series capacitor 36, load 26, the left half of the choke 11, main contact 12, holding coil 14, the commutating reactor 16, through the other pole of the D.-C. breaker 29 back to the negative terminal of the D.-C. source 10

(10—29—36—26—11—12—14—16—29—10)

The capacitor 36 charges up to the D.-C. voltage of the source 10 and the capacitor 35 discharges to zero. The discharge current to capacitor 35 will flow through the choke 11 to prevent sudden increases and decreases of the current, thereby maintaining a constant current drain on the D.-C. source 10, as described in connection with Figure 1.

When the magnetic reed 18 touches the working contact 31, a small current will flow from the negative terminal of the D.-C. source 10, one pole of the D.-C. breaker 29, magnetic reed 18, working contact 31, current limiting resistor 48, contact operating coil 42 through the second pole of the D.-C. breaker 29 and to the positive terminal of the D.-C. source 10 (10—29—18—31—48—42—29—10).

The magnitude of the resistance of the resistor 48 will again limit the current flow in this circuit, as described in connection with resistor 47. The main contact 13 is closed, due to the energization of the contact operating coil 42. After the make step of the commutating reactor 17, the current will flow through the circuit from the positive terminal of the D.-C. source 10, the right pole of the D.-C. breaker 29, the commutating reactor 17, the contact holding coil 15, main contact 13, choke 11, load 26, capacitor 35, the left pole of the D.-C. breaker 29 back to the negative terminal of the D.-C. source 10 (10—29—17—15—13—11—26—35—29—10).

This current is fed by the discharge of the capacitor 36 which now has a polarity to oppose the D.-C. source 10 and the charge of capacitor 35 which has heretofore been discharged. The current will now increase in the newly established circuit of the main contact 12, due to the choke 11 which maintains the sum of the currents in both windings constant. The current flow in the main contact 13, therefore, increases at the detriment of the current in the main contact 12, which will decrease to zero, thereby causing commutating reactor 16 to go through its break step, and hence, the main contact 12 will open.

The circuit arrangement of Figure 6 has the advantage of not requiring a transformer and having the capacitors 35—36 connected in series with the load. Hence, if the reactive component of the A.-C. output current increases, the increased current flowing through the capacitor will automatically compensate for it, as the circuit behaves similar to a series capacitor arrangement in a power line.

Figure 7 shows a variation of the circuit shown in Figure 1. The difference consists of having the commutating reactors 16 and 17 in series with the main contacts 12 and 13 only, whereas the inrush current through the vibrator contacts 30 and 31 is limited by the resistors 47 and 48. When the contact 30 is closed by the reed 18, the current immediately rises to the full value limited by resistor 47 only; this current magnetizes coil 14 which closes contact 12. Only when 12 closes, the inrush current through it is limited by the commutating reactor 16, going through its make step. When the make step is over, the full current flows through 16—12—14, and the current through 30 and 47 is reduced to a very small value due to the low impedance of the saturated reactor 16. The advantage of this circuit is that the make step protects the main contact, which is sensitive to inrush current, whereas the vibrator contacts are protected by resistors which are quenching the switching arcs.

Figure 8 shows the same circuit as Figure 7, except that a number of auxiliary parts are added and that the electromagnetic contacts are shown with their operating magnets.

The parts 10 to 48 are the same as previously described, 51 and 52 are the closing magnets, they are integrally combined with the closing contacts 83 and 84. The closing coils 14 and 15 are wound around the closing magnets. The contacts 12 and 13 are closed and opened by the magnetic forces acting upon the armatures 57 and 58. The opening magnets 53 and 54 are magnetized with the D.-C. magnetizing coils 55 and 56. It is possible to replace these coils by permanent magnets. Magnetic flux, constantly maintained by the coils 55, 56, attracts the armatures 57, 58 to the opening poles; to close, the magnetic force of the closing poles overcomes the magnetic force of the opening poles. Commutating reactors 16 and 17 have easily saturable cores 67, 68; they are supplied with a D.-C. bias through the bias coils 69, 70 and an A.-C. pre-excitation through the coils 65, 66. Across the A.-C. pre-excitation windings are connected the straightener circuits consisting of the capacitors 71—72, 75—76; the resistors 73—74, 79—80; and the chokes 77—78. Operation of the commutating reactors with easily saturable cores, bias, pre-excitation and straighteners is described in my application, Serial No. 212,017, filed February 21, 1951.

The D.-C. bias for the opening coils and for the commutating reactors is provided by the source 10, through 56—70—63—55—69. The choke 63 is inserted in order to prevent to flow in this circuit, induced in the coils 55, 56, 69, 70 by the fast changing magnetic fluxes through them.

The A.-C. pre-excitation current is provided by the output A.-C. voltage through the circuit 22—66—64—65—23. The choke 64 provides a 90° phase shift between voltage and current, and prevents the flow of high harmonic current ripples. Purpose of the D.-C. bias is to compensate for the one-sided operation of the magnetic material in the cores 67, 68, due to their operation on pulsed D.-C., the D.-C. bias being in opposition to the main direct current. Purpose of the A.-C. pre-excitation is to compensate for the difference in the magnetizing current for increasing flux at the make and decreasing flux at the break, this difference of current being due to the hysteresis of the magnetic material in the cores 67, 68. Purpose of the straighteners is to compensate for the irregular rise of the magnetizing current with increasing flux (called slope and curvature of the magnetizing curve).

Spark extinguisher circuits 59—61 and 60—62 are connected across the contacts 12 and 13. These circuits offer a low, resistive impedance immediately after opening of the contacts, and a high capacitive impedance some time later, when the contact is fully open.

The A.-C. output circuit is connected through an A.-C. breaker 81 which might have overload, undervoltage, or other tripping devices. The D.-C. breaker 29 should be equipped with an overload tripping device, to interrupt in case of backfires, short-circuits or spill overs.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a free inverter comprising a vibrator, a first and second electromagnetically operated switch, a first and second commutating reactor, a transformer, a capacitor, and a choke; said vibrator comprising a first and second working contact; said first and second electromagnetically operated switches comprising a first and second main contact respectively and a first and second contact operating coil respectively; said transformer having a primary and secondary winding; said capacitor connected in parallel with said primary winding; a reed; said reed having a first and second position; said reed in said first position connecting said first commutating reactor and said first contact operating coil in series with a D.-C. source; energization of said contact operating coil by said D.-C. source being effective to close said first main contact; said first main contact being shunted by said reed and said working contact when moved to said closed position by said contact operating coil; said capacitor being charged when said first main contact is closed; said capacitor discharging through said first commutating reactor, said first contact operating coil, said first main contact, said second main contact, said second contact operating coil and said second commutating reactor after said reed is moved to said second position; the current flow from said discharging capacitor bucking the current in said first contact operating coil and aiding the current in said second contact operating coil; the current flow from said D.-C. source being maintained constant by said choke, the current flow from said capacitor increasing until the current through said first contact has reached zero; said first commutating reactor holding the current at zero.

2. In a free inverter comprising a first and second commutating reactor, a first and second electromagnetically operated switch, a vibrator, a capacitor, and a transformer; said first and second electromagnetically operated switches comprising a first and second main contact respectively and a first and second contact holding coil respectively; said vibrator comprising a magnetic reed and a first and second working contact; said reed having a fixed end and a free end; said free end of said reed having a first and second position; said reed engaging said first working contact when in said first position; said reed engaging said second working contact when in said second position; said first commutating reactor, said first contact holding coil and said first main contact connected in series to a first terminal of a D.-C. source; said second commutating reactor, said second contact holding coil and said second main contact connected in series to said first terminal of said D.-C. source; said first main contact having a shunt circuit when said reed is in said first position; said second main contact having a shunt circuit when said reed is in said second position; said transformer having a primary and secondary winding; said capacitor connected in parallel with said primary winding; said first commutating reactor connected to a second terminal of said primary winding; a choke connected to a second terminal of said D.-C. source and to a center tap of said primary winding.

3. In a free inverter for supplying alternating current to a load from a D.-C. source comprising a vibrator, commutating reactor, a commutating capacitor, a choke and electromagnetically operated switches; said vibrator having an auxiliary contact and working contacts; said electromagnetically operated switches having a main contact and a contact operating coil; said capacitor, said commutating reactors, said contact operating coils and said main contact connected in a closed circuit; a reed for said vibrator having a first, second and third position; said reed engaging said auxiliary contact when said reed is in said third position; said reed engaging said working contacts when in said first and second position; said reed and said working contacts forming a parallel path for said main contacts when said reed is in said first and second position; said choke smoothing current flow through said main contacts and said commutating reactor.

4. In an inverter for supplying alternating current to a load from a D.-C. source comprising a vibrator, commutating reactor, a commutating capacitor, a smoothing choke, and electromagnetically operated switches; said vibrator having an auxiliary contact and working contacts; said electromagnetically operated switches having a main contact and a contact operating coil; said capacitor, said commutating reactors, said contact operating coils and said main contacts connected in a closed circuit; a reed for said vibrator having a first, second and third position; said reed engaging said auxiliary contact when said reed is in said third position; said reed engaging said working contacts when in said first and second position; said reed and said working contacts forming a parallel path for said main contacts when said reed is in said first and second position; said choke preventing the current through said capacitor from reaching an extremely high value when said main contacts close.

5. In a free inverter comprising a vibrator, a first and second electromagnetically operated switch, a first and second commutating reactor; a transformer and a capacitor; said vibrator comprising a first and second working contact; said first and second electromagnetically operated switches comprising a first and second main contact respectively and a first and second contact operating coil respectively; said transformer having a primary and secondary winding; said capacitor connected in parallel with an A.-C. load; a reed; said reed having a first and second position; said reed in said first position connecting said first commutating reactor and said first contact operating coil in series with a D.-C. source; energization of said first contact operating coil by said D.-C. source being effective to close said first main contact; said first main contact being shunted by said reed and said working contact when moved to said closed position by said first contact operating coil; said capacitor being charged when said first main contact is closed; said capacitor discharging through said first commutating reactor, said first contact holding coil, said first main contact, said second main contact, said second contact holding coil and said second commutating reactor after said reed is moved to said second position; the current flow from said discharging capacitor bucking the current in said first contact holding coil and aiding the current in said second contact holding coil.

6. In an inverter comprising a first and second commutating reactor, a first and second electromagnetically operated switch, a vibrator, a capacitor, a transformer, and a choke; said first and second electromagnetically operated switches comprising a first and second main contact respectively and a contact holding coil respectively; said vibrator comprising a magnetic reed and a first and second working contact; said reed having a fixed end and a free end; said free end of said reed having a first and second position; said reed engaging said first working contact when in said first position; said reed engaging said second working contact when in said second position; said first commutating reactor, said first contact coil and said first main contact connected in series to a first terminal of a D.-C. source; said second commutating reactor, said second contact holding coil, and said second main contact connected in series to said first terminal of said D.-C. source; said first main contact having a shunt circuit when said reed is in said first position; said second main contact having a shunt circuit when said reed is in said second position; said capacitor connected in parallel with an A.-C. load; said first commutating reactor connected to a second terminal of said primary winding; said choke connected to a second terminal of said D.-C. source and to a center tap of said transformer; said first commutating reactor maintaining the current through said first main contact and said first contact holding coil at zero when said first main contact is being separated; said second commutating reactor maintaining the current through said second main contact and said second contact holding coil at zero when said second main contact is being separated.

7. In a free inverter comprising an electromagnetic switch, a commutating reactor, a capacitor and vibrating means; said vibrating means providing energy for synchronous operation of said electromagnetic switch; said electromagnetic switch having an engaged and disengaged position; said commutating reactor providing a step current when said electromagnetic switch is moved from the disengaged to an engaged position; said capacitor providing a bucking current for said electromagnetic switch; said capacitor and said commutating reactor enabling said electromagnetic switch to be moved from said engaged position to said disengaged position under substantially currentless conditions.

8. In a free inverter comprising an electromagnetic switch, a commutating reactor, a capacitor, a choke and vibrating means; said vibrating means providing energy for synchronous operation of said electromagnetic switch; said electromagnetic switch having an engaged and disengaged position; said commutating reactor providing a step current when said electromagnetic switch is moved from the disengaged to an engaged position; said capacitor providing a bucking current for said electromagnetic switch; said capacitor and said commutating reactor enabling said electromagnetic switch to be moved from said engaged position to said disengaged position under substantially currentless conditions; said choke preventing the current flow through said capacitor from reaching a large magnitude; said choke maintaining the current flow through said electromagnetic switch constant.

9. In an inverter for supplying alternating current to a load from a direct current source comprising electro- magnetically operated contacts; operating coils energizing the magnetic system of the electromagnetically operated contacts; means to cause energy from said D.-C. source to energize said operating coils in synchronism with a given frequency; said electromagnetically operated contacts and said operating coils being connected in series and forming a circuit connecting from said D.-C. source to said alternating current load; said operating coils holding said electromagnetically operated contacts closed as long as current flows therethrough; said electromagnetically operated contacts opening immediately when current ceases to flow through said operating coils.

10. In an inverter comprising electromagnetically operated contacts; magnetic cores bearing said electromagnetically operated contact; operating coils wound around and magnetizing said magnetic cores; commutating reactors connected in series with said electromagnetically operated contacts; said operating coils in the circuit connecting a D.-C. source to an A.-C. load; means to cause energy from said D.-C. source to energize said operating coils in synchronism with a given frequency; said commutating reactors provided with a D.-C. bias winding, an A.-C. bias winding, and a straightener circuit; said commutating reactors maintaining said current through the electromagnetically operated contacts and said operating coils at zero value in the time interval needed by the said electromagnetically operated contacts to open; said time interval starting only after said current has reached a low value in said operating coils.

11. An inverter comprising a first and second electromagnetically operated contact; a first and second magnetic core bearing said first and second electromagnetically operated contact respectively; operating coils wound around and energizing said first and second magnetic core respectively; a first and second commutating reactor connected in series with said first and second electromagnetically operated contact respectively and said first and second operating coil respectively; said first and second commutating reactor provided with a respective D.-C. bias, A.-C. bias and straightener circuit; said first and second electromagnetically operated contact short-circuitable by a first and second vibrator type contact respectively; said first and second vibrator type contact initiating a circuit from said D.-C. source through said first and second electromagnetically operated contact respectively; said first and second operating coil respectively and said first or second commutating reactor respectively to said A.-C. load long enough to close one of said first or second electromagnetically operated contact and carry said current from said D.-C. source to said A.-C. load; said last mentioned vibrator contact opening after said last mentioned electromagnetically operated contact has assumed the full current and before said last mentioned electromagnetically operated contact opens when said current from said D.-C. source to said A.-C. load has decreased to zero.

12. In a free inverter supplying alternating current to an A.-C. load; said inverter supplied by a D.-C. source; said D.-C. source connected in series with a smoothing choke; said A.-C. load connected in parallel with a capacitor; said inverter comprising a first and second electromagnetically operated contact; a first and second magnetic core bearing and magnetizing said first and second electromagnetically operated contact respectively; a first and second operating coil wound around and energizing said first and second magnetic core respectively; means for closing said first and second electromagnetic contact in synchronism with a desired frequency; each of said first and second electromagnetically operated contact connected in series with said first and second operating coil respectively; current through either of said first or second electromagnetically operated contact and said first or second operating coil respectively maintained constant by said choke; said capacitor driving the current in either of said first or second electromagnetically operated contact to zero when the other said electromagnetically operated contact is closed while said D.-C. choke prevents the current through said capacitor from reaching an extremely high value.

13. In a free inverter driven by an oscillator having a main contact and a commutating reactor; said commutating reactor having a saturated and unsaturated condition; said main contact having an engaged and disengaged position; said main contact moved from said disengaged position to said engaged position when said commutating reactor is in said unsaturated condition; a holding coil and an auxiliary coil for said main contact; said auxiliary coil energized by said oscillator; said holding coil energized by the direct current source of said inverter.

14. In an inverter having a main contact and a commutating reactor; said commutating reactor having a saturated and unsaturated condition; said main contact having an engaged and disengaged position; means for operating said electromagnetic contacts in synchronism with a desired frequency; said main contact moved from said disengaged position to said engaged position when said commutating reactor is in said unsaturated condition; a capacitor connected in series with said commutating reactor and said main contact; said capacitor providing a commutating current for said main contact to enable said main contact to move from said engaged position to said disengaged position when substantially no current flows through said main contact.

15. In an inverter having an electromagnetically operated main contact and an oscillating magnetic reed cooperating with a working contact; said magnetic reed having an engaged and disengaged position with respect to said working contact; impedances to maintain the current flow through said reed and said working contact at a minimum value; said reed and said working contact forming a shunt circuit for said commutating reactor and said main contact; said main contact having an engaged and disengaged position; said main contact moved from said disengaged position to said engaged position when substantially no current flows through said main contact due to a series commutating reactor; said working contact being connected in series with said impedances.

16. In a free inverter having a main contact, a working contact and a commutating reactor; said commutating reactor having a saturated and unsaturated condition; said main contact and working contact each having an engaged and disengaged position; said commutating reactor in said unsaturated condition when said main contact and said working contact are moved from said disengaged position to said engaged position; said working contact forming a short circuit for said commutating reactor and said main contact; said working contact connected in series with a resistor.

17. In a free inverter having a main contact, a working contact and a commutating reactor; said commutating reactor having a saturated and unsaturated condition; said main contact and working contact each having in engaged and disengaged position; said commutating reactor in said unsaturated condition when said main contact and said working contact are moved from said disengaged position to said engaged position; a capacitor connected in series with said commutating reactor and said main contact; said capacitor providing a commutating current for said main contact to enable said main contact to move from said engaged position to said disengaged position when substantially no current flows through said main contact; said main contact moved to said engaged position by an operating coil energized through said working contact; said main contact maintained in said engaged position by a holding coil energized through said main contact.

18. In an inverter having a capacitor, a choke, a first and second commutating reactor, and first and second electromagnetically operated contact; means for operating said electromagnetic contacts in synchronism with a desired frequency; said capacitor, said first and second electromagnetically operated contact and said first and second commutating reactor providing a commutating circuit through which said capacitor discharges when said first and second electromagnetically operated contact are simultaneously closed.

19. In an inverter having a capacitor, a choke, a first and second commutating reactor, and first and second electromagnetically operated contact; means for operating said electromagnetic contacts in synchronism with a desired frequency; said capacitor, said first and second electromagnetically operated contacts and said first and second commutating reactor providing a commutating circuit through which said capacitor discharges when said first and second electromagnetically operated contact are simultaneously closed; said capacitor increasing the current flow in said first electromagnetically operated contact while said choke decreases the current flow in said second electromagnetically operated contact when they are simultaneously closed.

20. In an inverter having a capacitor, a choke, a first and second commutating reactor, and first and second electromagnetically operated contacts; means for operating said electromagnetic contacts in synchronism with a desired frequency; said capacitor, said first and second electromagnetically operated contacts and said first and second commutating reactors providing a commutating circuit through which said capacitor discharges when said first and second electromagnetically operated contacts are simultaneously closed; said capacitor increasing the current flow in said first electromagnetically operated contacts while said choke decreases the current flow in said second electromagnetically operated contacts when they are simultaneously closed; said commutating reactor maintaining the current in said second electromagnetically operated contacts at zero while said last mentioned contacts are moved from engaged to disengaged position.

21. In an inverter for generating alternating currents from a direct current source comprising a vibrator for an electromagnet and an armature therefor, and an electrical circuit connection including said electromagnet and armature to said direct current source for opening and closing said circuit to said direct current source at a predetermined periodicity; a second electromagnet having an armature, circuit connections including said source and said second electromagnet completed by said first mentioned armature on energization of its associated first electromagnet; an armature for said second electromagnet; circuit connection completed by said second armature of said electromagnet providing a by-pass circuit for said second electromagnet by-passing said first armature; a saturable core reactor connected in the circuit of said second electromagnet and providing a high impedance in said circuit while the current therein is at a relatively low value and a low impedance when the current in said last circuit has reached its full value; a capacitor and electric circuit therefor connected to said second electromagnetic circuit for receiving a charging current and operable when said first armature reaches its alternate contact for discharging through said first reactor to set up a counter-electromagnetic force to said second electromagnet for de-energizing said second electromagnet after a predetermined interval following the energization of said second electromagnet.

References Cited in the file of this patent

UNITED STATES PATENTS

| | | |
|---|---|---|
| 1,157,336 | Steinmetoz | Oct. 19, 1915 |
| 2,209,806 | Bedford | July 30, 1940 |
| 2,284,794 | Bedford | June 2, 1942 |
| 2,568,140 | Belamin | Sept. 18, 1951 |
| 2,617,974 | Kesselring et al. | Nov. 11, 1952 |